Dec. 23, 1958  R. W. McFALL ET AL  2,866,191
INFORMATION INDICATING INSTRUMENT
Filed Dec. 28, 1950  2 Sheets-Sheet 1
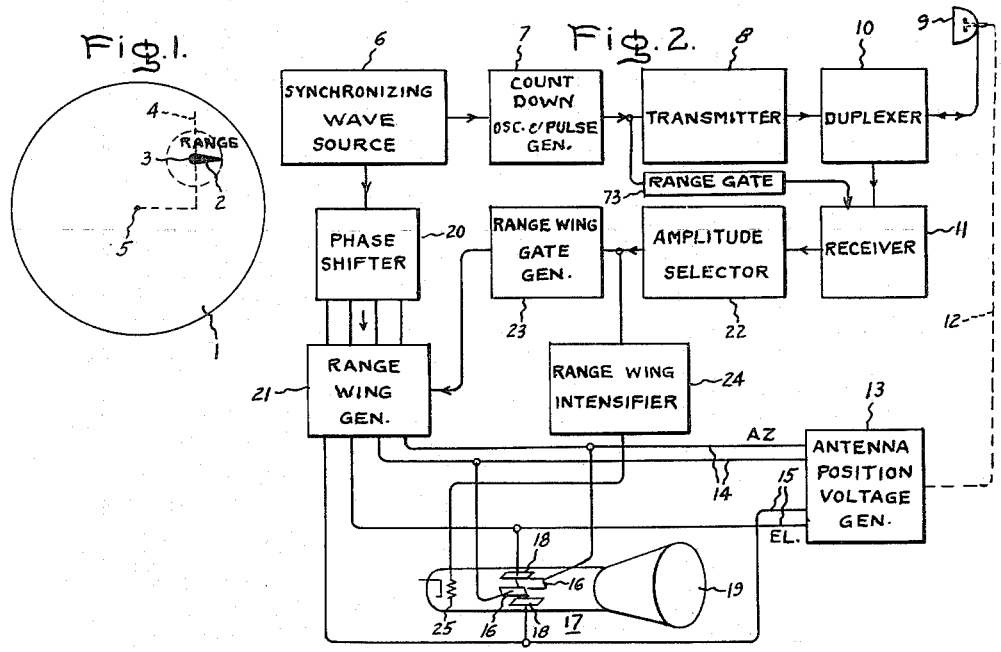
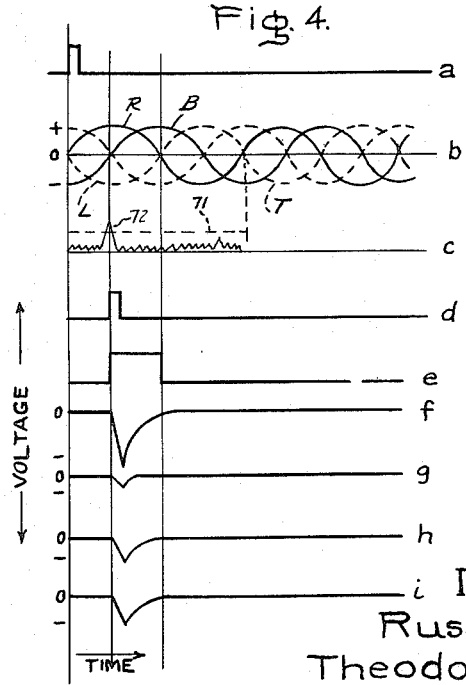
Inventors:
Russell W. McFall,
Theodore T. Johnson,
by Merton D Morse
Their Attorney.

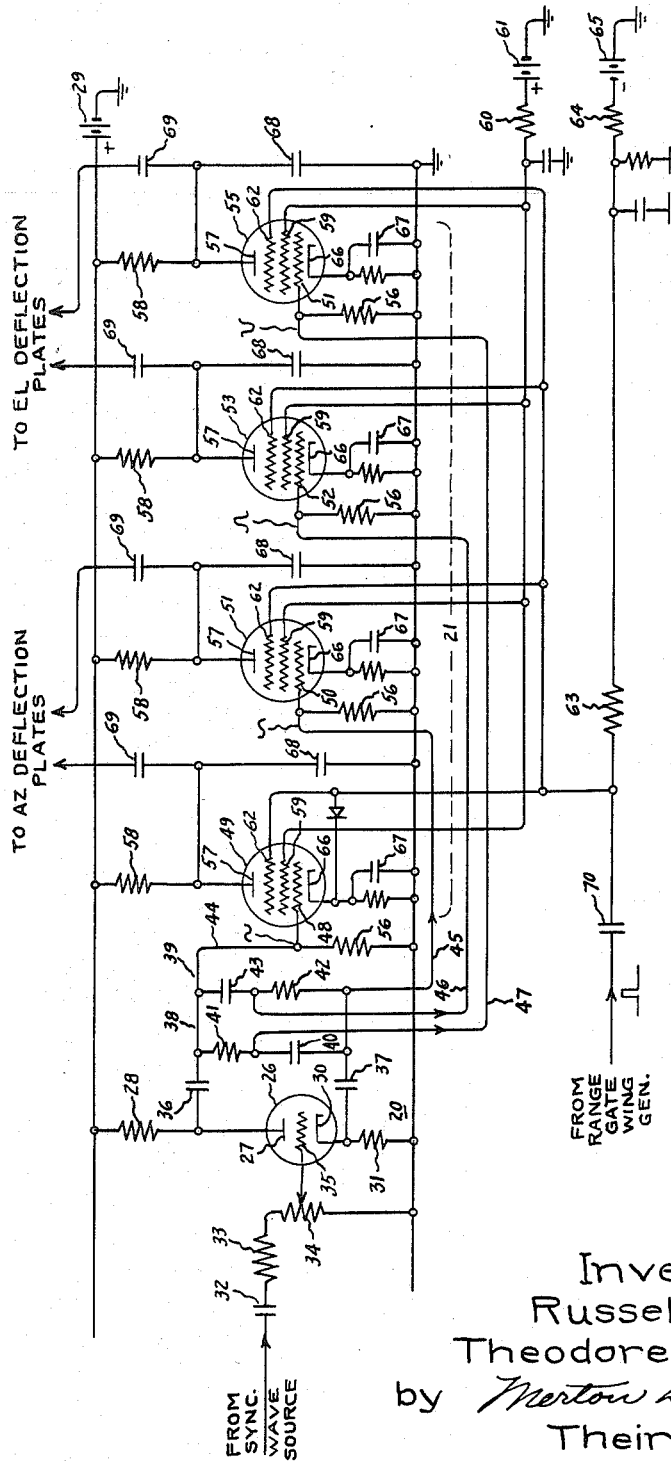

United States Patent Office 2,866,191
Patented Dec. 23, 1958

2,866,191

INFORMATION INDICATING INSTRUMENT

Russell W. McFall and Theodore T. Johnson, Schenectady, N. Y., assignors to General Electric Company, a corporation of New York Application December 28, 1950, Serial No. 203,048

9 Claims. (Cl. 343—11)

Our invention relates to indicating instruments and particularly to apparatus for presenting a plurality of information on a single indicator.

In the field of mensuration, it is often times desirable to display a plurality of data in measurable form on a common indicator. For example, in the field of obstacle detection of the radar type, display of the three spatial coordinates, such as range, azimuth angle and elevation angle, of a detected object on a single indicator would greatly facilitate monitoring by a single operator. Cathode ray tube indicators have been employed wherein a cathode ray is caused to trace a pattern on a screen representative of coordinates of the detected objects' position. Since the screen of the cathode ray tube is of planar construction usually only two coordinates of the object location are displayed. To indicate all three coordinates of the object location, two cathode ray tubes are normally employed on whose screens different combinations of the two coordinate information are displayed. It is obvious that the use of more than one indicator spaced apart renders it difficult for a single operator to monitor both presentations effectively.

An object of our invention is to provide an improved method and means for presenting at one location a plurality of indications so that all indications can be read at a glance.

A further object of our invention is to provide an improved means for indicating a plurality of information.

A still further object of our invention is to provide an improved means for indicating three coordinates representative of a spatial positioning of an object.

Another object of our invention is to provide a novel method and means for generating sweep voltages representative of a plurality of different information for display purposes on the screen of a cathode ray tube.

Another object of our invention is to provide an improved means for displaying radar information on a cathode ray tube indicator.

One embodiment of our invention is directed to radar obstacle detection systems wherein a cathode ray indicator tube is employed for displaying the spatial position information of detected objects. A first trace is generated whose terminus from some reference point is representative of the resultant of two coordinates of the object location, and a second trace emanating from the terminus of said first trace is generated having an angular position with respect to some reference position which corresponds to the third coordinate of said object location.

The features which are believed to be characteristic of our invention are set forth with particularity in the appended claims. Our invention itself, however, together with further objects and advantages thereof, can thus be understood by reference to the following description taken in connection with the accompanying drawing in which Fig. 1 is a view showing the screen of a cathode ray tube displaying information in three coordinates; Fig. 2 illustrates in block diagram form an embodiment for carrying out the invention; Fig. 3 is a schematic circuit diagram of an arrangement for generating sweep voltages necessary to obtain the indications shown in Fig. 1 and Fig. 4 illustrates graphically the wave shapes encountered at various points in the block and circuit diagrams of Figs. 2 and 3.

Referring to Fig. 1 there is illustrated a cathode ray tube display obtainable in accordance with an embodiment of the invention. In the particular application to a radar object detection system, it is desirable to display the three coordinates, namely, azimuth, elevation and range, of the detected object as cathode ray traces on the screen 1 of a single cathode ray tube. In accordance with the invention, a linear range trace 2 of fixed length is generated and caused to rotate about one end 3. The angular position of trace 2 with respect to a reference line 4 is made representative of the range of the detected object. The location of the point 3 from some reference point 5 is made representative of the azimuth and elevation of the detected object. The azimuth and elevation information may be presented in any coordinate system. For example, if a polar coordinate form of display is employed, the straight line distance of the point 3 from the point 5 is indicative of elevation, and the angular position of this straight line about the point 5 is representative of azimuth. Another form of two coordinate presentation, commonly referred to as the "C" type display, employs rectangular coordinates wherein the horizontal component of the straight line joining points 3 and 5 is representative of one coordinate, such as azimuth, and the vertical component of the same line is representative of the other coordinate, elevation. In the particular embodiment to be discussed in detail shortly, reference is made to the rectangular coordinate type of display for purposes of simplicity. In each case the third coordinate, namely range, is displayed with the other coordinates on the same screen as a linear trace 2 of fixed length emanating from the terminus point 3 and having an angular position about this point with respect to a reference line 4 which is made representative of the range of the object from the detection system. Thus, an operator monitoring the single display shown on the screen 1 is thus able to obtain the azimuth and elevation information of the detected object by noting the position of point 3 from point 5, and is able to read off the range information of the same object by noting the angular position of the trace 2 from the reference line 4.

Fig. 2 illustrates in block diagram form an arrangement for providing the display illustrated in Fig. 1. Synchronizing signals of sinusoidal form from the source 6 are counted down and used to generate pulses in the count-down oscillator-pulse generator 7. In its simplest form 7 may comprise a well known form of triggered multivibrator which produces one output pulse for a given plurality of applied input signals. For further details reference is made to Patent 2,420,516, A. F. Bischoff, Pulse Producing System, May 13, 1947. These pulses from 7 are then employed to cause transmitter 8 to transmit radar pulses of electromagnetic energy periodically over the movable directive antenna 9 toward remote objects to be detected. The necessity for the count down in block 7 will be explained shortly. The duplexer operates in a well known manner to channel the transmitted pulses to the antenna 9 and the pulse echoes reflected from the object and received by the antenna to the radio frequency receiver 11.

In detecting objects, the position of the radio beam, which is preferably made in pencil form, is indicative of the azimuth and elevation position of the object being detected. Radar systems employing this feature are well known. In one well known type of search radar system, the radiation pattern of a directive antenna employed for transmitting and receiving pulses is rotated in a helical path such that it scans both in azimuth and elevation. The instantaneous position of the antenna at any point in its path corresponds to a given azimuth and elevation position. Resolver selsyns or potentiometers are known, as for example as shown in Patent 2,436,655, R. C. Locke, Directive Radiant Energy Locating and Indicating System, February 24, 1948, which convert the instantaneous antenna position into corresponding electrical signals. By appropriately displaying these signals on a cathode ray tube it is possible to obtain a resultant cathode ray trace describing the antenna motion.

For purposes of simplicity, the antenna scanning arrangement is not illustrated in any great detail. The functioning of the radar system to provide the azimuth and elevation information of detected objects is exemplified by the use of a mechanical connection 12 which supplies the elevation and azimuth positioning of the antenna line of sight axis to the antenna position voltage generator 13 which generates azimuth information on one pair of output leads 14 and elevation information on another pair of output leads 15. As previously mentioned, the azimuth and elevation information may be presented on an indicator in any coordinate system. In the embodiment under consideration a rectangular coordinate display is disclosed wherein the azimuth position voltage is applied over leads 14 across the horizontal deflection plates 16 of the cathode ray tube 17, and the elevation positioning voltage is applied over leads 15 across the vertical deflection elements 18. This results in deflecting the cathode ray from its normal, centrally focused point shown as 5 in Fig. 1 to point 3 such that the horizontal component of the line connecting points 3 and 5 is representative of the azimuth position of the object being detected, and the vertical component of this same line is representative of the elevation position of the object being detected. In order to provide range information on the screen of the cathode ray tube, means must be provided for timing the interval between the transmission of radar pulses from antenna 9 and the reflection thereof from a remote object. Accordingly, the waves from the source 6, employed to control the time of transmission of pulses to an object located in space, are also employed to generate sweep voltages capable of providing a circular sweep on the screen 19 of the cathode ray tube 17. Circle generating sweep voltages are generated in order that the trace 2 of fixed length may be angularly rotated in accordance with the range of the detected object. Since the range information to be displayed involves the measurement of time intervals after each pulse transmission which are shorter than the duration between transmitted pulses, the sine waves from source 6 are applied directly without a countdown to a phase shifter 20 which generates four quadrature phased voltages. These quadrature phased sinusoidal voltages are continuously applied to a range wing generator 21. The instantaneous relative amplitudes of the four voltages applied to the range wing generator are indicative of a given time interval measured from the time of transmission of radar pulses toward an object in space. If applied directly to the deflection elements of the cathode ray tube together with the azimuth and elevation voltages from source 13, a circle of fixed radius would be generated about the point 3 shown in Fig. 1. The successive instantaneous positions of the cathode ray along the arc of this hypothetical circle in a clockwise direction from the line 4, which is indicative of the time of radar pulse transmission, are representative of different time intervals after the pulse transmission and hence indicative of range. In order to provide a single linear trace from the point 3 to a point on the hypothetical circle at a given angle from the reference position 4, the range wing generator 21 is arranged to supply the quadrature phased voltages to the indicator 18 only upon the receipt of suitable radar pulses by receiver 11. A range gate generator 73 is provided which renders the receiver 11 operative to receive pulses from the antenna 9 only during a period after each pulse transmission corresponding to the maximum usable range of the detection equipment. A common type of range gate 73 comprises a multivibrator triggered by the synchronizing pulse output of 7 to generate a positive going square wave of voltage of fixed duration. This positive square wave is applied to overcome a cut-off bias in the receiver thereby rendering the receiver operative to receive pulses reflected from a detected object to the antenna 9. The received pulses are first applied to an amplitude selector 22 which discriminates against relatively lower amplitude noise pulses, generated in the receiver, and passes substantially only the pulses received from objects being detected to the range wing gate generator 23. This generator, which may comprise a multivibrator, triggered by pulses from 22, provides narrow gating pulses in the order of two microseconds duration which are applied to the normally blocked range wing generator 21 to permit passage of the continuous quadrature phase voltages available from the shifter 20 to the deflection plates of the indicator 17. The range wing generator 21 is arranged to provide the linear trace 2 shown in Fig. 1, having an angular position with respect to the reference line 4 which is representative of the range of the detected object.

The received radar pulses passed by amplitude selector 22 are also applied to the range wing intensifier 24 which generates a 30 microsecond pulse. Intensifier 24 may also comprise a triggered multivibrator. The 30 microsecond pulse is applied to the intensity control grid 25 of the cathode ray tube for intensity modulating the cathode ray thereof. The result is a brightened trace 2 occurring on the screen of the cathode ray tube having one terminus whose position in rectangular coordinates is representative of the azimuth and elevation of the object being detected, and an angular position with respect to the reference line 4 which is representative of the range of the object being detected.

Referring to Fig. 3 there is shown a circuit diagram arrangement for generating the range wing 2, shown in Fig. 1, in accordance with one embodiment of the invention. The phase shifter 20 comprises an electron discharge device 26 having its anode 27 connected through a loading resistor 28 to a source of positive unidirectional potential 29 and its cathode 30 connected to ground through an unbypassed cathode load resistor 31. The sinusoidal voltage from the synchronizing wave source 6 is applied over coupling condenser 32 and resistor 33 across potentiometer 34. The movable tap on the potentiometer 34 is connected to the control grid 35 of device 26. The sinusoidal output voltages appearing at the cathode 30 and anode 27 are respectively in phase and out of phase with the voltage applied to the control grid 35. These sinusoidal output voltages are applied through respective coupling condensers 36 and 37 to two pairs of phase shifting networks 38 and 39. One of the phase shift networks comprises the series connection of condenser 40 and resistance 41, and the other network comprises the series connection of resistor 42 and condenser 43. Output leads 44, 45, 46 and 47 are connected to respective points in the two phase shift networks such that four quadrature phased voltages are made available on these leads.

Assuming the phase of the sinusoidal voltage applied to the control grid 35 is of reference phase, the voltage available over lead 44 is 180° out of phase therewith and is applied to the first control grid 48 of electron discharge device 49. Similarly, a reference phase voltage is applied to the first control grid 50 of device 51, a voltage 90° out of phase with the reference phase is applied to the first control grid 52 of device 53, and a voltage 270° out of phase with the reference phase is applied to the first control grid 54 of device 55. Devices 49, 51, 53 and 55, operate as gated pentode amplifiers for applying their respective, varying input voltages during a predetermined gating period to the deflection elements of the cathode ray tube. Each of devices 49, 51, 53 and 55 comprises a resistor 56 providing a ground return for the first control grid. The anodes 57 are connected through respective loading resistors 58 to the source of positive unidirectional potential 29. The screen grids 59 are connected through a common loading resistor 60 to a source of positive unidirectional potential 61. The suppressor or second control grids 62 are commonly connected through resistors 63 and 64 to a source of negative unidirectional potential 65 such that normally there is no electron discharge current flow to the respective anodes during any time interval when the quadrature phase voltages are being applied to the first control electrodes 48, 50, 52 and 54. In this condition, electron discharge current flows only to the screen grids 59. The cathodes 66 of the gated amplifiers are connected through respective biasing circuits 67 to ground. Similar condensers 68 are connected between ground and the respective anodes 57 of the gated amplifiers. Under normal operating conditions when devices 49, 51, 53 and 55 have no current flowing to their anodes, condensers 68 charge up through respective resistors 58 to substantially the potential of the unidirectional potential source 29. Respective coupling condensers 69 are provided between the anodes of each of devices 49, 51, 53 and 55 and respective deflection elements of the cathode ray tube 17 shown in Fig. 2. With condensers 68 charged to substantially the same fixed unidirectional potential, no deflection signals are applied over coupling condensers 69 to the deflection elements of indicator 17 and hence the cathode ray rests at point 3 in Fig. 1 corresponding to some azimuth and elevation position.

In operation, due to the negative bias on the second grids 62, the quadrature phased voltages applied to the first control electrodes 48, 50, 52 and 54 are unable to cause devices 49, 51, 53 or 55 to conduct current to anodes 57. Hence, the condensers 68 are permitted to charge to substantially the potential of the unidirectional source 29. However, the simultaneous application of the positive two microsecond gating pulse from the range wing gate generator 23 over condenser 70 to each of the suppressor grids 62, overcomes the negative bias established by source 65, and causes current flow to the anodes 57 in accordance with the instantaneous amplitude of the sinusoidal voltages available at the respective input control grids 48, 50, 52 and 54. The resultant voltage drops at the anodes 57 cause respective condensers 68 to discharge to a level dependent upon the instantaneous amplitude of the respective input voltages within the time duration of the gating pulse applied to the grids 62. The changing voltages at the anodes 57 and, hence, also across the condensers 68 are applied over respective condensers 69 to the deflection plates of the indicator 17 to cause the cathode ray to move out rapidly to the hypothetical circle previously mentioned. Upon termination of the two microsecond gating pulses, condensers 68 charge to their initial condition allowing the spot to move back to its initial position at an exponential rate. The time constants of the discharging and charging circuits for the condensers 68 are such that the spot is deflected to its outermost position before the cessation of the range wing gating pulse, and returns to its undeflected position before the termination of the positive pulse applied to the cathode ray intensity control grid 25 of the cathode ray tube 17. Since the cathode ray tube control grid has been positive during this 30 microsecond interval, the spot in moving to its initial position will paint a range wing. As previously described, the angular position of the range wing measured clockwise from the reference position 4 shown in Fig. 1 will be proportional to the time elapsed between the transmission of a radar pulse and the reception of the reflected pulse from the object under detection, and, hence representative of the range of the object. Since the spot moves to its undeflected position at an exponential rate and stops before the end of the positive intensity grid pulse, the indication has a tear-drop shape, the heavy end indicating the angular position of the target.

Referring to Fig. 4, the voltage wave shapes encountered in the various points in the circuit arrangement of Figs. 2 and 3 are plotted versus time. Graph *a* indicates the time occurrence of synchronizing pulses available from the output of the pulse generator 7 which determine the time of transmission of the radar pulses to a remote object. Graph *b* indicates the quadrature phase voltages available from the output of phase shifter 20. It should be noted that as a result of the count down oscillator 7, the pulses shown in graph *a* employed to operate the transmitter have a larger period than the sinusoidal voltages available from the output of the phase shifters. The sinusoidal voltages are labeled L, R, T and B signifying left, right, top and bottom deflection elements of the cathode ray tube 17 shown in Fig. 2. Only one cycle of the sinusoidal voltages shown in graph *b* are employed for timing the arrival of echo pulses after the transmission of corresponding radar pulses. Correspondingly, referring to graph *c*, only the pulses received by antenna 9 during one cycle of the sinusoidal wave shown in graph *b* are permitted by the range gate 73 to be applied through the receiver to the amplitude selector 22. Dotted line 71 indicates the threshold level set in the amplitude selector 22 such that only received pulses such as 72, having an amplitude above this level, are passed to the range wing gate generator 23 and the range wing intensifier 24. As a result of the occurrence of the selected pulse 72, range wing gate generator 23 generates a two microsecond pulse shown in graph *d* occurring substantially at the time the echo pulse is received. This two microsecond pulse discharges condensers 68 in the range wing generator 21 to levels corresponding to the instantaneous amplitudes of the sinusoidal signals applied to the control electrodes 25 as shown in graphs *f, g, h* and *i*. By comparing the graph *b* with graphs *f, g, h,* and *i* during the time interval of the gating pulse in graph *d*, it is seen that the sine wave marked L causes a very large negative voltage to appear across its respective condenser 68, graph *f*, whereas for the voltage marked R, substantially a zero voltage is available as shown in gragh *g*. The voltages T and B, during the same interval, being of the same amplitude cause their corresponding condensers to be discharged to the same level as shown in graphs *h* and *i*. The latter corresponds to substantially half the maximum level of discharge as shown in graph *f*. As soon as the two microsecond pulse in graph *d* has terminated, the condensers 68 begin to charge exponentially to a positive reference potential as shown in graphs *f, g, h, i*. It is this exponential return which is relatively slow compared to the initial rapid discharge of the condensers which provides a trace from some maximum radius established by the maximum values of the sinusoidal voltages shown in graph *b* towards the point 3 shown in Fig. 1, and corresponding to the particular elevation and azimuth position of the antenna 9. The graph *e* of Fig. 4 indicates the 30 microsecond pulse generated by the intensifier 24 and applied to control electrode 25 of the cathode ray tube for intensity modulating the beam such that the return trace shown in graphs *f, g, h* and *i* are visible.

While a specific embodiment has been shown and described it will be understood that various modifications may be made and developed without departing from the invention. The appended claims are therefore intended to cover any such modifications within the true spirit and scope of the invention.

What we claim as new and desire to secure by Letters Patent of the United States is:

1. In a pulse echo system, the combination of means to radiate pulses in directions varying in elevation and azimuth, a cathode ray tube having a viewing screen, means to receive echoes of said pulses and to produce an indication at a point on said screen varying in position in accord with the direction from which said echoes are received both in elevation and in azimuth, means to produce a visible trace extending through said point, means for measuring the time intervals between the radiation of pulses and the reception of corresponding echoes, and means timed with the radiation of pulses to displace angularly said trace about said point in accord with the values of said measured time intervals, thereby to indicate the range from which said echoes are received.

2. In a pulse echo system, the combination of means to radiate pulses at a given repetition rate in directions varying in elevation and azimuth, a cathode ray tube having a viewing screen, means to receive echoes of said pulses and to produce an indication at a point on said screen varying in position in accord with the direction from which said echoes are received both in elevation and in azimuth, means to produce during each pulse repetition period a visible trace extending through said point including means to generate a substantially invisible trace extending from said point to its terminus and means to generate a return visible trace to said point, and means to displace angularly said trace about said point in accord with the time between the radiated pulses and the receipt of echoes thereof thereby to indicate the range from which said echoes are received.

3. In an object detection system, means to transmit pulses toward a remote object to be detected, means to receive said pulses after reflection from said object, a cathode ray tube having a viewing screen, means responsive to the direction of said reflected pulses to deflect the cathode ray of said cathode ray tube in accordance with the direction from which said reflected pulses are received, means responsive to said reflected pulses to vary the intensity of said cathode ray beam to produce an indication at a point on said screen during the occurrence of said reflected pulses, means to produce a visible trace of fixed length on said screen extending from said point, and means adapted after each pulse transmission to vary the angular position of said trace about said point with respect to a predetermined angular position thereof, and means for controlling the operation of said last named means after each pulse transmission to select an angular position related to the time interval between the transmission of said pulses and the receipt of reflections from said object, whereby the position of said point on said screen represents the direction of said object and the inclination of said trace with respect to said angular position represents the distance of said object from said system.

4. In an object detection system, means to transmit periodically pulses toward a remote object to be detected, means to receive said pulses after reflection from said object, a cathode ray tube having a viewing screen, first deflection means responsive to the direction of said reflected pulses to deflect the cathode ray of said tube in accordance with the direction from which said pulses are received, means synchronized with said transmitted pulses and adapted to cause said ray to be deflected in a generally circular pattern, means responsive to said reflected pulses for rendering said latter means operative for a short interval, means responsive to said reflected pulses for varying the intensity of said ray to produce a spot on said screen during said interval, means to deflect said ray after said interval toward a position determined by said first deflection means, means to maintain said ray at a predetermined intensity during the deflection thereof to said predetermined position, whereby a trace is produced on said screen the terminus of which represents the direction of said object and the inclination of which represents the range of said object from said system.

5. In an object detection system, antenna means to transmit pulses toward a remote object to be detected, means to receive said pulses after reflection from said object, a cathode ray tube having a viewing screen and two pairs of deflection plates, means for applying voltages from said antenna means to said plates to deflect the cathode ray of said tube in accordance with the direction from which said pulses are received, a capacitance means connected in circuit with each of said plates in a manner that the charge on each of said capacitances determines the potential of respective ones of said plates, means to charge said capacitances to predetermined potentials, means to generate two pairs of voltages synchronized with said transmitted pulses, said voltages occurring in phase quadrature sequence in such a manner that were each of said voltages applied to respective ones of said plates electric fields adapted to deflect said ray in a generally circular pattern would be produced, means responsive to said reflected pulses for discharging each of said capacitive means to a potential corresponding to the instantaneous potential of respective ones of said voltages, means for charging said capacitances, means responsive to said reflected pulses to vary the intensity of said ray during said discharge and charge periods to produce a trace on said screen extending from a deflection position determined by said first means, whereby a trace is produced on said screen the terminus of which is representative of the direction of said object and the inclination of which is representative of the range of said object from said system.

6. In a pulse echo system, the combination of means to radiate pulses in directions varying in elevation and azimuth, a cathode ray tube having a viewing screen, means to receive echoes of said pulses and to produce a first indication at a point on said screen varying in position in accord with the direction from which said echoes are received both in elevation and in azimuth, means to produce a second indication at a point along the circumference of a circle having a fixed radius about said first point, and means for selecting the position of said second point along the circumference of said circle in accordance with the time-lapse between the radiation of a pulse and the reception of a corresponding echo.

7. Indicating apparatus for use with measuring apparatus that supplies a plurality of types of information, said indicating apparatus comprising a cathode-ray tube having a screen, means for producing an indication at a first point on said screen which is variable in two coordinates, each of which corresponds to and is a function of a respective one of said types of information supplied by said measuring apparatus, means for producing through said first point on said screen an angularly displaceable, cathode-ray trace of constant length whose angular position corresponds to and is a function of a further one of said types of information supplied by said measuring apparatus, said last named means comprising a source of timing signals, means timed with respect to said timing signals to produce a second indication at a point along the circumference of a circle centered about said first point, means for selecting the position of said second point along said circle as a function of said further one of said types of information, and means for producing said angularly displaceable trace between said first and second points.

8. In combination a cathode ray tube having a viewing screen for displaying a plurality of signals, means for producing a first indication at a point on said screen, means for displacing said first indication point on said screen in two coordinates in accordance with the amplitude of two respective signals, means to produce a second indication at a second point along the circumference of a circle centered about said displaced first indication point, and means for displacing said second point along the circumference of said circle in accordance with the amplitude of a third signal.

9. An arrangement for displaying a plurality of signals comprising a cathode ray tube having a viewing screen, means responsive to two of said signals for producing a first indication on said screen positionable in two coordinates in accordance with the amplitudes of two of said signals, a source of a circular trace generating signal, means timed with respect to a third one of said signals for producing a linear trace emanating from said first indication, and means timed with respect to said third one of said signals and responsive to the circle generating signal from said source for angularly displacing said linear trace about said first indication.

References Cited in the file of this patent

UNITED STATES PATENTS

| | | |
|---|---|---|
| 2,262,033 | Moseley | Nov. 11, 1941 |
| 2,262,245 | Moseley | Nov. 11, 1941 |
| 2,400,232 | Hall | May 14, 1946 |
| 2,408,415 | Donaldson | Oct. 1, 1946 |
| 2,427,905 | Fyler | Sept. 23, 1947 |
| 2,433,002 | Norton et al. | Dec. 23, 1947 |
| 2,436,655 | Locke | Feb. 24, 1948 |
| 2,463,529 | Ferrill | Mar. 8, 1949 |
| 2,495,115 | Mayer | Jan. 17, 1950 |
| 2,530,060 | Holdam et al. | Nov. 14, 1950 |
| 2,701,352 | Kingdom et al. | Feb. 1, 1955 |